United States Patent Office 2,947,732
Patented Aug. 2, 1960

2,947,732

TERNARY POLYMERS OF TRIFLUOROETHYL ACRYLATE, ACRYLONITRILE, AND AN ESTER OF ACRYLIC ACID

Benjamin D. Halpern, Jenkintown, and Wolf Karo, Elkins Park, Pa., assignors to The Borden Company, New York, N.Y., a corporation of New Jersey No Drawing. Filed Apr. 8, 1958, Ser. No. 727,037

4 Claims. (Cl. 260—80.5)

This invention relates to solvent-resistant polymers. In particular, it relates to high temperature resistant polymers which have high solvent and oil resistance and can be readily shaped and formed by conventional processing equipment.

In accordance with application No. 465,725 filed October 29, 1954, (Halpern, Karo & Levine) copolymers of trifluoroethyl acrylate with acrylonitrile yield useful heat resistant polymers. If the acrylonitrile content is 12% or less, elastomeric materials are formed which can be compounded with ordinary rubber compounding ingredients and can be cured with a combination of sulfur and an amine base. Such cured products show excellent heat resistance and substantially maintain their physical properties even after being exposed to oils and solvents at high temperatures for as long as 250 hours. However, they exhibit the disadvantage of swelling while exposed to the oil or solvents so that dimensional stability of products exposed thereto is difficult to maintain. Although the swelling is reversible, the temporary distortions are of consequence, especially where the material is part of a mechanical device.

In accordance with this invention, we have found that swelling can be substantially reduced in copolymers of trifluoroethylacrylate-acrylonitrile without sacrificing any of its other desirable properties. The compounds of this invention comprise ternary polymers made from a monomer mixture of 40 to 95 parts by weight of trifluoroethylacrylate, 0.5 to 30 parts by weight of acrylonitrile and 0.5 to 30 parts by weight of a polymerizable acrylate ester containing only carbon, hydrogen and oxygen. Examples of such esters are the methyl, ethyl, butyl, octyl, methoxyethyl and phenyl acrylates. The compounds of this invention which exhibit outstanding elastomeric properties as well as solvent and heat resistance are ternary polymers made from a monomer mixture of 85 to 95 parts by weight of trifluoroethyl acrylate, 0.5 to 10 parts by weight of acrylonitrile and 0.5 to 10 parts by weight of an acrylate ester selected from a group consisting of octyl acrylate and methoxyethyl acrylate.

The preparation of trifluoroethyl acrylate is usually carried out by reacting trifluoroethanol (B.P. 74.05° C. $d_{22°}$ 1.3739 g./ml.) with acrylyl chloride in the presence of triethylamine. The formula for trifluoroethanol is $CF_3CH_2OH$ and the formula for the acrylate ester thereof is $CH_2=CH—COO—CH_2CF_3$. The physical properties of trifluoroethyl acrylate are as follows:

B.P. _____ 91–92° C.
$n_D^{25}$ _____ 1.3475

The polymerization may be carried out by bulk, suspension or emulsion techniques. With suspension or emulsion polymerization catalysts are used, as, for example, benzoyl peroxide or lauroyl peroxide.

Illustrative examples showing the preparation of compounds of this invention are given below.

Example I

A solution of 22.5 grams of trifluoroethyl acrylate, 1.25 gms. of methoxyethyl acrylate, 1.25 gms. of acrylonitrile and 0.025 gm. of lauroyl peroxide was added to a beverage bottle. To this mixture was added in turn 30 ml. of a 1.25% solution of polyvinyl alcohol in water, 30 ml. of 0.21% solution of sodium hydrosulfite in water and 30 ml. of a 0.21% solution of potassium persulfate in water. The bottle was then sealed with a crown cap and shaken at 50° C. in a water bath for 48 hours. The product was then filtered off, washed with water and dried to provide an 83% yield of 90%–5%–5% ternary polymer.

Example II

By a similar procedure as in Example I, a ternary polymer of 90% trifluoroethyl acrylate-5% acrylonitrile-5% octyl acrylate was prepared by substituting 1.25 gms. of octyl acrylate for the methoxyethyl acrylate.

Example III

By a similar procedure as in Example I a 94% trifluoroethyl acrylate-5% acrylonitrile-1% octyl acrylate ternary polymer was prepared by using as the monomer mixture 23.5 gms. of trifluoroethyl acrylate, 0.25 gm. of octyl acrylate and 1.25 gms. of acrylonitrile.

Each of the above products was compounded by mixing 100 parts of the ternary polymer with 35 parts of carbon black (PHILBLACK O) and compared as indicated below with a 95% trifluoroethyl acrylate-5% acrylonitrile binary polymer similarly prepared, as a standard. Milled strips were prepared from each of the materials and soaked for 14 days at 25° C. in a solution of 70 parts isooctane and 30 parts toluene and compared with the standard binary polymer.

The standard increased 23.9% in volume, but Example I only increased 11.7%, Example II—15.2%, and Example III only 5.32%.

Further, when each of these products was heated for 72 hours at about 150° C. the ternary polymers showed a substantial reduction in weight loss as compared with the binary polymer. Thus, for example, the product of Example II showed a 0.591% weight loss as compared with a 0.86% weight loss for the binary polymer.

It should be noted that polymerizable acrylate containing only carbon hydrogen and oxygen with neither nitrogen nor fluorine are not particularly noted for solvent resistance of their homopolymers, so that this substantial increase in swelling resistance and heat resistance was surprising and unpredictable.

We claim:

1. Ternary copolymers of a mixture of the monomers trifluoroethyl acrylate of the formula $$CH_2=CH—COO—CH_2CF_3$$

acrylonitrile, and a polymerizable ester selected from the group consisting of methyl, ethyl, butyl, octyl, methoxyethyl and phenyl esters of acrylic acid, the proportions by weight of the three monomers being about 85–95 parts, 0.5–10 parts, and 0.5–10 parts, respectively, for 86–115 parts total weight of the said mixture.

2. The copolymer of claim 1, the ester of acrylic acid being octyl acrylate.

3. The coploymer of claim 1, the ester of acrylic acid being phenyl acrylate.

4. The copolymer of claim 1, the ester of acrylic acid being methoxyethyl acrylate.

References Cited in the file of this patent

UNITED STATES PATENTS 2,642,416  Ahlbrecht et al. _____ June 16, 1953
2,834,763  Halpern et al. _____ May 13, 1958